(12) United States Patent
Adachi et al.

(10) Patent No.: US 7,970,636 B2
(45) Date of Patent: Jun. 28, 2011

(54) REPLACEMENT PART ORDER PROCESSING APPARATUS, METHOD FOR ORDERING REPLACEMENT PARTS AND COMPUTER-READABLE RECORDING MEDIUM

(75) Inventors: Seiji Adachi, Atsugi (JP); Yoshio Ohno, Ayase (JP); Hideaki Ohashi, Higashiyamato (JP); Toshiyuki Sato, Kasukabe (JP)

(73) Assignee: Ricoh Company, Ltd., Tokyo (JP)

( * ) Notice: Subject to any disclaimer, the term of this patent is extended or adjusted under 35 U.S.C. 154(b) by 672 days.

(21) Appl. No.: 12/010,593

(22) Filed: Jan. 28, 2008

(65) Prior Publication Data
US 2008/0215628 A1    Sep. 4, 2008

(30) Foreign Application Priority Data
Jan. 29, 2007    (JP) .................................. 2007-018395

(51) Int. Cl.
*G06F 17/30*    (2006.01)
(52) U.S. Cl. .................. 705/7; 705/1; 705/28; 702/188; 702/184; 701/29
(58) Field of Classification Search ................ 705/7–10; 702/188, 184; 701/29
See application file for complete search history.

(56) References Cited

U.S. PATENT DOCUMENTS

| | | | | |
|---|---|---|---|---|
| 5,216,612 | A * | 6/1993 | Cornett et al. | 700/96 |
| 7,212,976 | B2 * | 5/2007 | Scheer | 705/7 |
| 7,457,785 | B1 * | 11/2008 | Greitzer et al. | 706/12 |
| 7,593,904 | B1 * | 9/2009 | Kirshenbaum et al. | 706/12 |
| 2002/0143598 | A1 * | 10/2002 | Scheer | 705/9 |
| 2003/0034995 | A1 * | 2/2003 | Osborn et al. | 345/713 |
| 2004/0220778 | A1 * | 11/2004 | Imai et al. | 702/188 |
| 2005/0125281 | A1 * | 6/2005 | Henrickson et al. | 705/10 |

FOREIGN PATENT DOCUMENTS

JP    2003-099550    4/2003

* cited by examiner

*Primary Examiner* — Vanel Frenel
(74) *Attorney, Agent, or Firm* — Harness, Dickey & Pierce, P.L.C.

(57) ABSTRACT

A controlling unit of a replacement part management server specifies a maintenance target equipment and acquires order conditions from a responsible personnel terminal. The controlling unit acquires maintenance information and part information both relating to the maintenance target equipment. The controlling unit calculates prediction residual regarding target parts of an initial value setting process, and compares the prediction residual with the shortest cycle. When the prediction residual is smaller than the shortest cycle, the controlling unit sets the number of replacements in the part order data storing unit. When an initial value setting process regarding all the parts is completed, an order input screen is output. When an order request is received from the responsible personnel terminal, an order management server acquires part order data and transmits a preparation instruction of a PM kit to the purchaser.

5 Claims, 9 Drawing Sheets

FIG. 11

PM KIT ORDER INPUT ORDER PART SETTING 530

| PART NUMBER | PART NAME | REPLACEMENT DATE | COUNTER | REPLACEMENT CYCLE | PREDICTION RESIDUAL | QUANTITY | ORDERED QUANTITY |
|---|---|---|---|---|---|---|---|
| x x x | x x x x | YYMMDD | x x x x | x x x x | x x x | x x | [x x] |
| x x x | x x x x | YYMMDD | x x x x | x x x x | x x x | x x | [x x] |
|  |  | YYMMDD | x x x x | x x x x | x x x | x x | [x x] |

PROCESSED ☐     1: CONFIRM ORDER     2: ADD PART NUMBER

REPLACEMENT PART ORDER PROCESSING APPARATUS, METHOD FOR ORDERING REPLACEMENT PARTS AND COMPUTER-READABLE RECORDING MEDIUM

BACKGROUND OF THE INVENTION

1. Field of the Invention

The present invention relates to a replacement parts ordering processing apparatus and others for ordering parts needed for periodic maintenance.

2. Description of the Related Art

Electronic equipment such as a Multiple Function Peripheral (MFP) requires maintenance to sustain its performance. For example, a remote monitoring server connected to a network monitors abnormality of the electronic equipment. When this remote monitoring server detects abnormality, a maintenance personnel such as a customer engineer (CE) is notified of the abnormality, and maintenance may be performed.

Such maintenance may require replacement parts. Conventionally, when the replacement parts are needed for maintenance operation, customer engineers have confronted the distress of procuring the needed parts so that those parts are delivered before the day he or she makes the next visit to the client for maintenance. Typically, when the replacement parts are needed, the customer engineer accesses a part control system, checks if the required parts are in stock, and arranges delivery of the parts to the client when the stock is available. On the other hand, when the required parts are out of stock, the date in which the parts will be arriving is confirmed and their delivery to the client is arranged by the customer engineer. Depending on the stock availability of the parts, visiting day is arranged with the client.

The distress have stimulated studies on the exchange part ordering system that gives an instruction to perform maintenance operation to a customer engineer based on abnormality status notified from an image forming apparatus, and performs a delivery process to ship the replacement part to a predetermined location when the replacement of the part is necessary (see, e.g. Unexamined Japanese Patent Application KOKAI Publication No. 2003-99550, page 1). According to the noted reference, the replacement part ordering system receives replacement part information regarding the parts that need replacing, and transmits delivery instruction information for delivering the parts on predetermined designated date to a delivery vendor, based on part control information including received replacement part information and stock status of the parts.

To prevent abnormality from occurring, a customer engineer performs periodic maintenance of an installed electric equipment by visiting a client. This periodic maintenance is performed when a predetermined condition is satisfied. The condition is, for example, that the number of outputs (prints) since the last maintenance has exceeded a predetermined number.

In such a periodic maintenance, some parts should be replaced. However, different parts will have different replacement cycles. Accordingly, the cycle of periodic maintenance would be in accord with the shortest of the replacement cycles of the parts used in the electronic equipment.

In addition to the periodic maintenance, there is an irregular maintenance that may be performed when abnormality occurs, so that a part may be replaced. In this case, there is no need to replace those parts which have not yet reached the replacement timing in its replacement cycle even at the time to perform the periodic maintenance.

Further, in performing periodic maintenance, the customer engineer needs to prepare the parts needed for replacement. However, if tens of clients are scheduled to be visited in one month and if tens of parts are required for each client, the preparation would be extremely bothersome.

As a measure to this problem, it is indeed possible to prepare enough replacement parts for the periodic maintenance, but, in doing so, a large number of stocks must be retained. It is not preferable to retain more than required stocks in view of sustaining appropriate level of the amount of stocks. Further, such stock must be abandoned when the parts are changed.

The present invention has been made in order to solve the above-mentioned problem. An object of the invention is to provide a replacement part order processing apparatus, etc. for efficiently ordering parts required for periodic maintenance.

SUMMARY OF THE INVENTION

In order to solve the above-mentioned problem, the replacement part order processing apparatus according to a first aspect of the present invention is a replacement part order processing apparatus connected to a maintenance responsible personnel terminal via a network, and specifying parts that need replacing in an equipment that is target for maintenance, the apparatus comprising:

a part information storing unit that stores part identifier information and replacement cycle amount information of parts for use in maintenance of equipment, in such a way that both information is associated with equipment type information indicating the type of equipment that is the target of maintenance;

a maintenance target equipment information storing unit that stores: maintenance target equipment identifier information for specifying maintenance target equipment; equipment type information of the maintenance target equipment; and shortest cycle amount information indicating a shortest of cycle amounts in which maintenance of the target equipment is performed, in such a way that the each information is associated with each other for each maintenance target equipment;

an output history information storing unit that stores: maintenance target equipment identifier information for specifying the maintenance target equipment; usage amount information indicating the usage amount of the maintenance target equipment; and confirmation date information indicating the date in which the usage amount is confirmed, in such a way that each information is associated with each other for each maintenance target equipment;

a maintenance history information storing unit that stores, for each replacement of parts performed, maintenance target equipment identifier information specifying the equipment in which the part is used, part identifier information specifying the replaced part, a date on which the parts are replaced, and a replacement-time usage amount information indicating a usage amount of the maintenance target equipment at the date on which the parts are replaced, in such a way that each information is associated with each other; and a controlling unit which performs a replacement part specifying process for specifying a part in need of replacement in a maintenance target equipment, wherein in the replacement part specifying process, the controlling unit:

when maintenance target equipment identifier information is acquired from the maintenance responsible personnel terminal, acquires equipment type information associated with the maintenance target equipment identifier information from the maintenance target equipment information storing unit and acquires part identifier information and replacement cycle amount information, each of which is associated with the equipment type information, from the part information storing unit;

for each of the parts specified by the part identifier information, acquires replacement-time usage amount indicating the usage amount at the time of the nearest replacement from the maintenance history information storing unit;

for each of the specified parts, acquires a current usage amount of the maintenance target equipment associated with maintenance target equipment identifying information of the maintenance target equipment from the output history information storing unit, calculates a difference obtained by subtracting the replacement-time usage amount from the current usage amount, and calculates a prediction residual by subtracting the difference from the acquired replacement cycle amount; and for each of the specified parts, compares the shortest cycle amount of the maintenance target equipment stored at the maintenance target equipment information storing unit with the calculated prediction residual, and executes a generation process of generating order information for ordering the part when the prediction residual is smaller than the shortest cycle.

In this way, a responsible personnel who performs maintenance is capable of specifying parts to be replaced without considering past maintenance history as well as durable years, and of ordering parts required for efficient maintenance.

The controlling unit may further acquire information related to scheduled maintenance date from the maintenance responsible personnel terminal and generate order information of the parts by setting the desired delivery date based on the scheduled maintenance date in the generation process. In this way, parts may be obtained at the intended time in accord with maintenance.

The controlling unit may further acquire information related to the installation location of a maintenance target equipment from the maintenance responsible personnel terminal and generate order information of the parts by setting the delivery destination based on the installation location in the generation process. In this way, parts may be obtained at the intended location in accord with maintenance.

The replacement part order processing method according to a second aspect of the present invention is a method for ordering replacement parts executed by a replacement part order processing apparatus which is connected to a maintenance responsible personnel terminal via a network, the replacement part order processing apparatus comprising a part information storing unit, a maintenance target equipment information storing unit, an output history information storing unit, a maintenance history information storing unit, and a controlling unit, the method comprising the steps of:

i) storing part identifier information and replacement cycle amount information of parts for use in maintenance of equipment, in such a way that both information is associated with equipment type information indicating the type of equipment that is the target of maintenance, the step i) executed by the part information storing unit;

ii) storing: maintenance target equipment identifier information for specifying maintenance target equipment; equipment type information of the maintenance target equipment; and shortest cycle amount information indicating a shortest of cycle amounts in which to perform maintenance of the target equipment, in such a way that the each information is associated with each other for each maintenance target equipment, the step ii) executed by the maintenance target equipment information storing unit;

iii) storing: maintenance target equipment identifier information for specifying the maintenance target equipment; usage amount information indicating the usage amount of the maintenance target equipment; and confirmation date information indicating the date in which the usage amount is confirmed, in such a way that each information is associated with each other for each maintenance target equipment, the step iii) executed by an output history information;

iv) storing: for each replacement of parts performed, maintenance target equipment identifier information specifying the equipment in which the part is used, part identifier information specifying the replaced part, a date on which the parts are replaced, and a replacement-time usage amount information indicating a usage amount of the maintenance target equipment at the date on which the parts are replaced, in such a way that each information is associated with each other, the step iv) executed by the maintenance history information storing unit; and v) specifying a part in need of replacement in a maintenance target equipment, the step v) executed by the controlling unit, wherein the step v) comprises the steps, executed by the controlling unit, of:

when maintenance target equipment identifier information is acquired from the maintenance responsible personnel terminal, acquiring equipment type information associated with the maintenance target equipment identifier information from the maintenance target equipment information storing unit and acquiring part identifier information and replacement cycle amount information, each of which is associated with the equipment type information, from the part information storing unit;

for each of the parts specified by the part identifier information, acquiring replacement-time usage amount indicating the usage amount at the time of the nearest replacement from the maintenance history information storing unit;

for each of the specified parts, acquiring a current usage amount of the maintenance target equipment associated with maintenance target equipment identifying information of the maintenance target equipment from the output history information storing unit, calculating a difference obtained by subtracting the replacement-time usage amount from the current usage amount, and calculating a prediction residual by subtracting the difference from the acquired replacement cycle amount; and for each of the specified parts, comparing the shortest cycle amount of the maintenance target equipment stored at the maintenance target equipment information storing unit with the calculated prediction residual, and executing a generation process of generating order information for ordering the part when the prediction residual is smaller than the shortest cycle.

A computer-readable recording medium according to a third aspect of the present invention records thereon a program for controlling a computer connected to a maintenance responsible personnel terminal via a network to function as:

a part information storing unit that stores part identifier information and replacement cycle amount information of parts for use in maintenance of equipment, in such a way that both information is associated with equipment type information indicating the type of equipment that is the target of maintenance;

a maintenance target equipment information storing unit that stores: maintenance target equipment identifier information for specifying maintenance target equipment; equipment type information of the maintenance target equipment; and shortest cycle amount information indicating a shortest of cycle amounts in which maintenance of the target equipment is performed, in such a way that the each information is associated with each other for each maintenance target equipment;

an output history information storing unit that stores: maintenance target equipment identifier information for specifying the maintenance target equipment; usage amount information indicating the usage amount of the maintenance target equipment; and confirmation date information indicating the date in which the usage amount is confirmed, in such a way that each information is associated with each other for each maintenance target equipment;

a maintenance history information storing unit that stores: for each replacement of parts performed, maintenance target equipment identifier information specifying the equipment in which the part is used, part identifier information specifying the replaced part, a date on which the parts are replaced, and a replacement-time usage amount information indicating a usage amount of the maintenance target equipment at the date on which the parts are replaced, in such a way that each information is associated with the part identifier information specifying the replaced parts, for each of the maintenance target equipments; and a controlling unit which performs a replacement part specifying process for specifying a part in need of replacement in a maintenance target equipment, wherein in the replacement part specifying process, the controlling unit:

when maintenance target equipment identifier information is acquired from the maintenance responsible personnel terminal, acquires equipment type information associated with the maintenance target equipment identifier information from the maintenance target equipment information storing unit and acquires part identifier information and replacement cycle amount information, each of which is associated with the equipment type information, from the part information storing unit;

for each of the parts specified by the part identifier information, acquires replacement-time usage amount indicating the usage amount at the time of the nearest replacement from the maintenance history information storing unit;

for each of the specified parts, acquires a current usage amount of the maintenance target equipment associated with maintenance target equipment identifying information of the maintenance target equipment from the output history information storing unit, calculates a difference obtained by subtracting the replacement-time usage amount from the current usage amount, and calculates a prediction residual by subtracting the difference from the acquired replacement cycle amount; and for each of the specified parts, compares the shortest cycle amount of the maintenance target equipment stored at the maintenance target equipment information storing unit with the calculated prediction residual, and executes a generation process of generating order information for ordering the part when the prediction residual is smaller than the shortest cycle.

BRIEF DESCRIPTION OF THE DRAWINGS

These objects and other objects and advantage of the present invention will become more apparent upon reading of the following detailed description and the accompanying drawings in which:

FIG. 11 is an explanatory diagram of a display screen being output to a display of a responsible personnel terminal.

DETAILED DESCRIPTION OF THE PREFERRED EMBODIMENT

Hereinafter, one specific embodiment of the present invention will be described with reference to FIGS. 1 to 12. In this embodiment, a replacement part order processing apparatus for ordering replacement parts used when periodic maintenance (PM) is performed will be explained.

Figure 12:
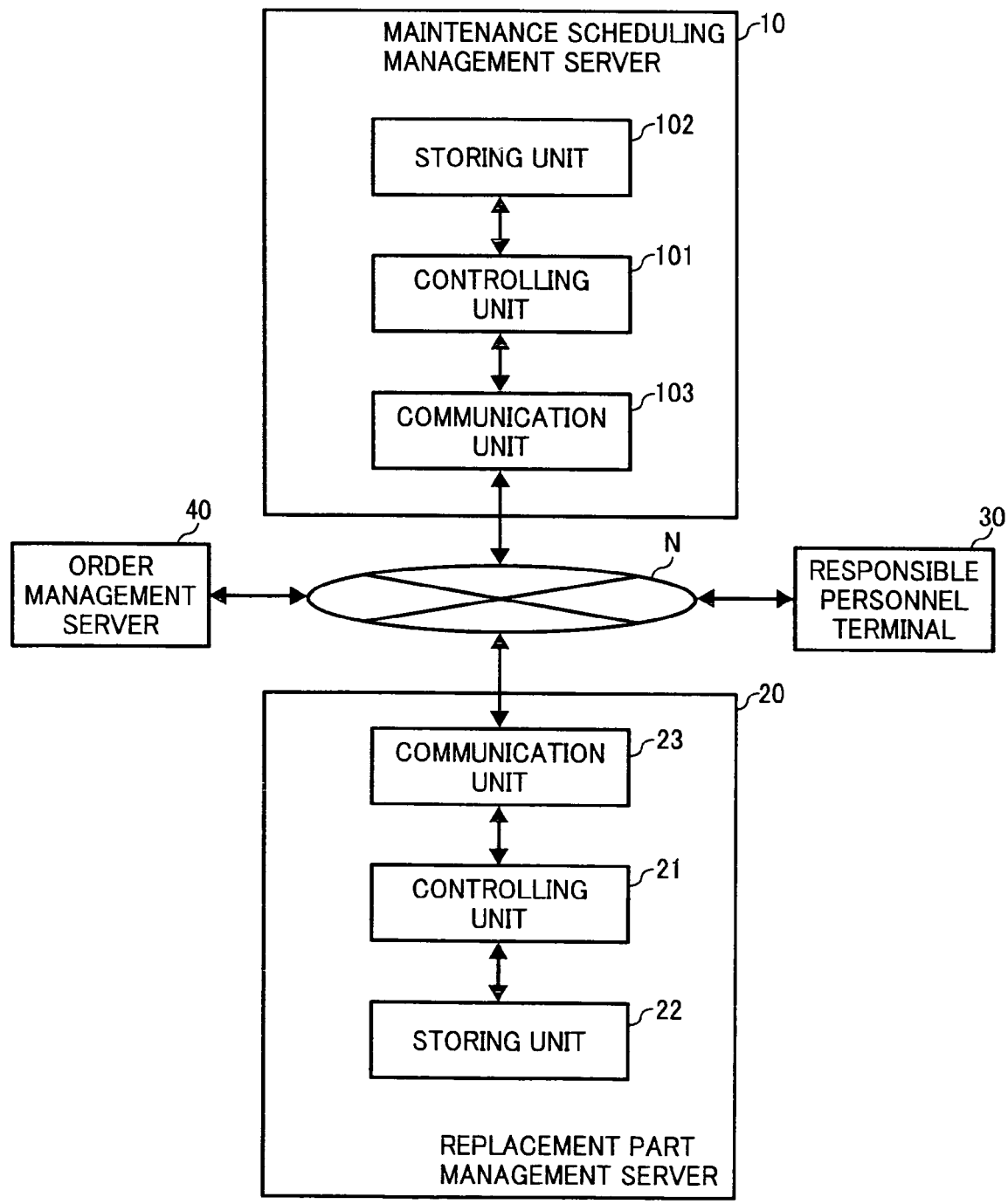
FIG. 12 is a schematic view of the system of one embodiment of the present invention.

As illustrated in FIG. 12, a maintenance scheduling management server 10, a replacement part management server 20, a responsible personnel terminal 30, an order management server 40 are interconnected via a network N.

Figure 1:
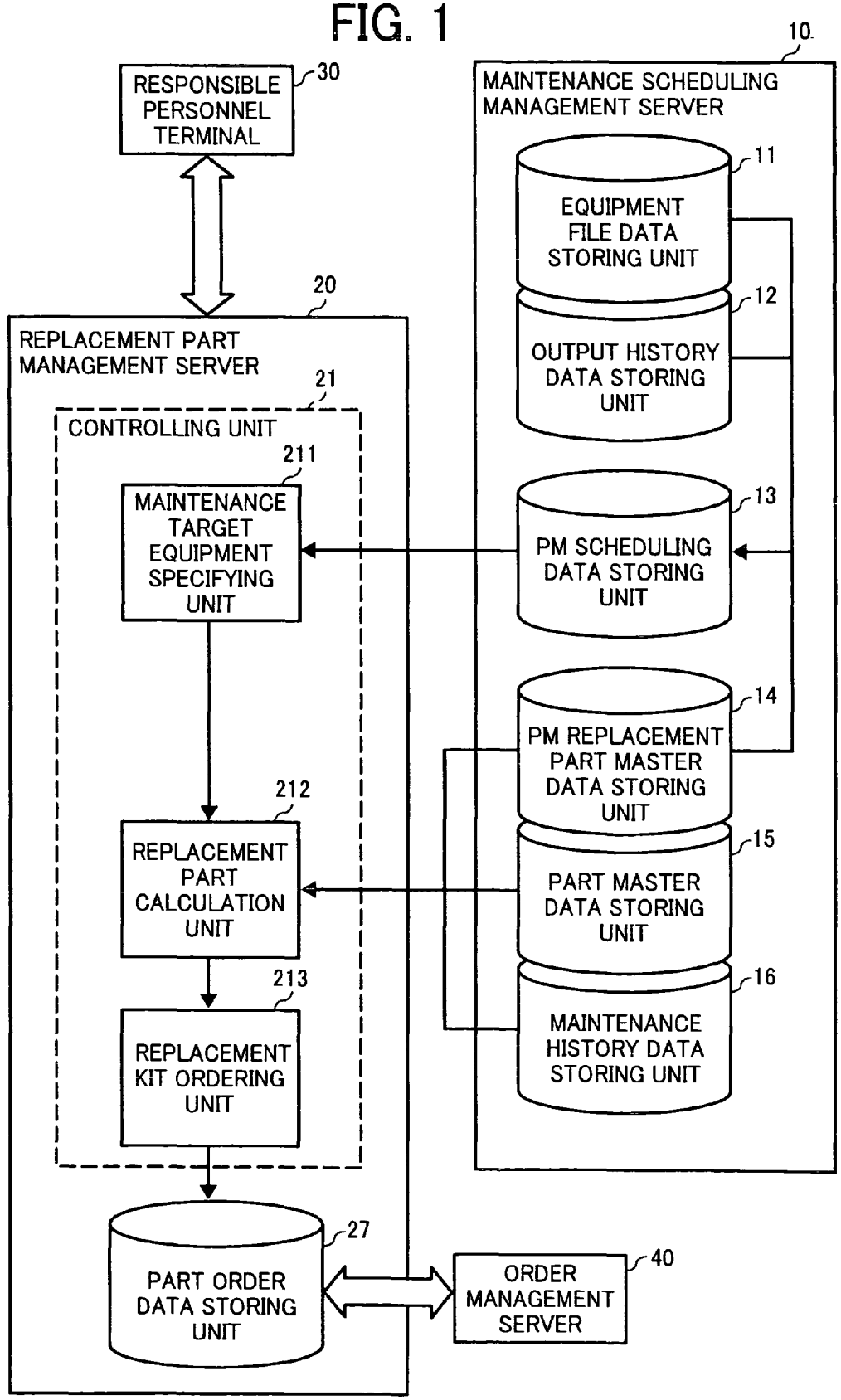
FIG. 1 is a functional block diagram showing the system of one embodiment of the present invention.
Figure 2:
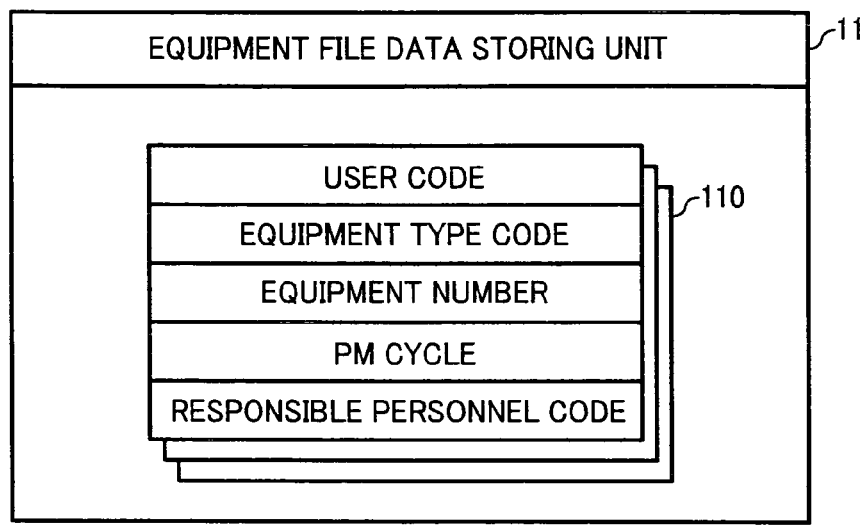
FIG. 2 is an explanatory diagram showing data stored at the equipment file data storing unit.

FIG. 1 shows a functional block diagram of the above-mentioned maintenance scheduling management server 10, replacement part management server 20, responsible personnel terminal 30, and order management server 40, interconnected with each other. The maintenance scheduling management server 10 generates a scheduling (maintenance scheduling) according to which periodic maintenance (PM) of an electronic equipment (here, MFP) used by a client is performed. The maintenance scheduling management server 10 specifies an electronic equipment in need of performing periodic maintenance to generate a PM scheduling data based on a PM cycle stored at an equipment file data storing unit 11 by the predetermined day (eg. 20th day) of the preceding month. The maintenance scheduling management server 10 subsequently provides the replacement part management server 20 with the generated PM scheduling data.

This maintenance scheduling management server 10 comprises a controlling unit 101, a storing unit 102 comprised of a high-capacity storage apparatus and others, a communication unit 103 provided with a communication interface communicating with other computers via network N, etc.

The controlling unit 101 comprises a CPU (Central Processing Unit) (not shown), an ROM (Read Only Memory) (not shown), an RAM (Random Access Memory) (not shown), and others, and controls the maintenance scheduling management server 10 as a whole. Specifically, the CPU performs a control/operation process by executing a program stored in the ROM and the storing unit 102. When performing a control/operation process, the CPU temporarily stores various data in the RAM, and utilizes the RAM as a work domain.

The storing unit 102 stores a program controlling the maintenance scheduling management server 10 and is provided with an equipment file data storing unit 11, an output history data storing unit 12, a PM scheduling data storing unit 13, a PM replacement part master data storing unit 14, a part master data storing unit 15, a maintenance history data storing unit 16, etc. The program controlling the maintenance scheduling management server 10 may be stored in the ROM, rather than in the storing unit 102.

The equipment file data storing unit 11 functions as a maintenance target equipment information storing unit, and stores equipment file data 110 for managing an electronic equipment used by a client. The equipment file data 110 is registered before the client begins utilizing the electronic equipment, and renewed when new information is added. The equipment file data 110 includes data relating to a user code, an equipment type code, an equipment number, a PM cycle, and a responsible personnel code.

Identifier information for specifying a client using an electronic equipment is stored in a user code data field. By utilizing this user code, information relating to client companies, contact information thereof, as well as installation location of the electronic equipment can be obtained from a client master data storing unit (not shown).

An equipment type code data field and an equipment number data field stores identifier information for specifying the equipment type and the equipment number, (maintenance target equipment identifier), respectively, of an electronic equipment utilized by this client.

A PM cycle data field stores data (shortest cycle amount) for determining a periodic maintenance timing of an electronic equipment utilized by a client. The PM cycle represents the shortest cycle of the replacement cycles of those parts periodically being replaced in this electronic equipment.

A responsible personnel code data field stores identifier information for specifying a customer engineer in charge of this client.

Figure 3:
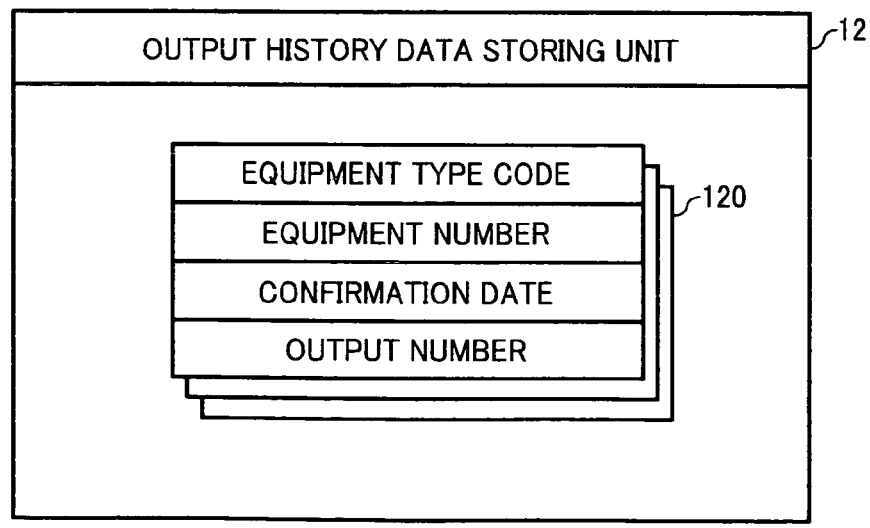
FIG. 3 is an explanatory diagram showing data stored at the output history data storing unit.

The output history data storing unit 12 functions as an output history information storing unit. The output history data storing unit 12 stores output history data 120 for specifying usage history of each electronic equipment, as shown in FIG. 3. This output history data 120 is sequentially accumulated from the time a client begins using the electronic equipment. The output history data 120 includes data such as the equipment type code, the equipment number, the confirmation date, and the number of outputs.

An equipment type code data field and an equipment number data field stores identifier information for specifying the equipment type and the equipment number, respectively, of an electronic equipment utilized by a client.

A confirmation date data field stores data for specifying the date and time in which usage status of this electronic equipment is confirmed. Here, the usage status is defined by the number of papers output by the MFP. The date and time at which a customer engineer conducts hearing from a client to grasp the number of outputs or acquires output number information by a monitoring apparatus which remotely monitors the status of the electronic equipment via a network An output number data field stores data for specifying usage amount (number of paper outputs) at the time at which this usage status is confirmed.

Figure 4:
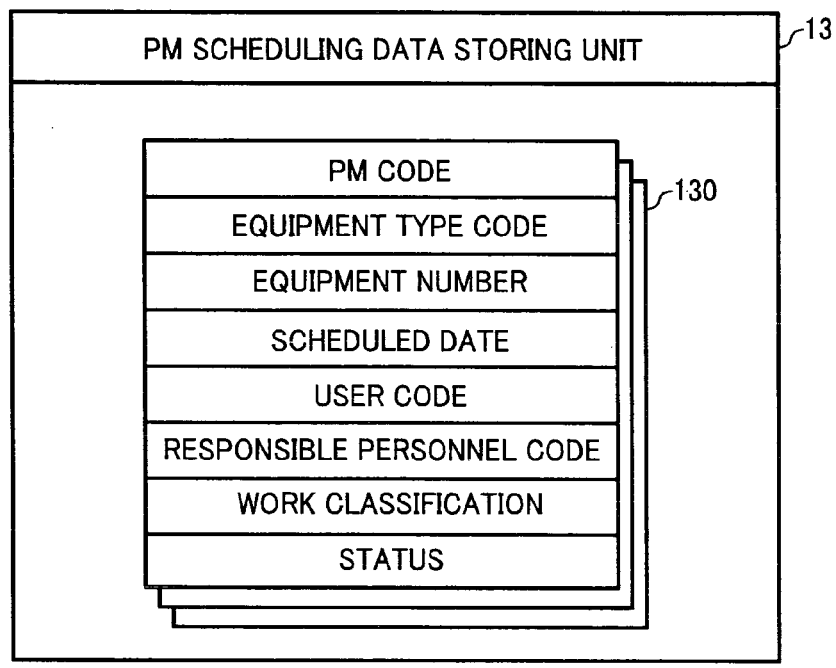
FIG. 4 is an explanatory diagram showing data stored at the PM scheduling data storing unit.

As shown in FIG. 4, a PM scheduling data storing unit 13 stores PM scheduling data 130 for specifying target equipment for which periodic maintenance is performed during the month concerned. This PM scheduling data 130 is stored when PM scheduling data is acquired from the maintenance scheduling management server 10. This PM scheduling data 130 comprises data such as a PM code, an equipment type code, the equipment number, the scheduled date, a user code, a responsible personnel code, a working classification, and a status.

A PM code data field stores identifier information for specifying periodic maintenance during the month concerned.

An equipment type code data field and an equipment number data field stores identifier information for specifying the equipment type and the equipment number, respectively, of electronic equipment that is the target for periodic maintenance during the month concerned.

A scheduled date data field stores data indicating the scheduled date upon which the present periodic maintenance is performed.

A user code data field stores identifier information for specifying the client who utilizes this electronic equipment.

A responsible personnel code data field stores data related to an identifier for specifying a responsible personnel who has this client in his/her charge, and who executes periodic maintenance.

A work classification data field stores identifier information for specifying maintenance work that is performed by the present maintenance. Here, the work classification data field stores identifier information for specifying periodic maintenance.

A status data field stores data for determining whether the order of replacement parts used by this maintenance has been placed. Specifically, when an ordering process of replacement parts is performed, an "order complete" flag is stored in this data field.

Figure 5:
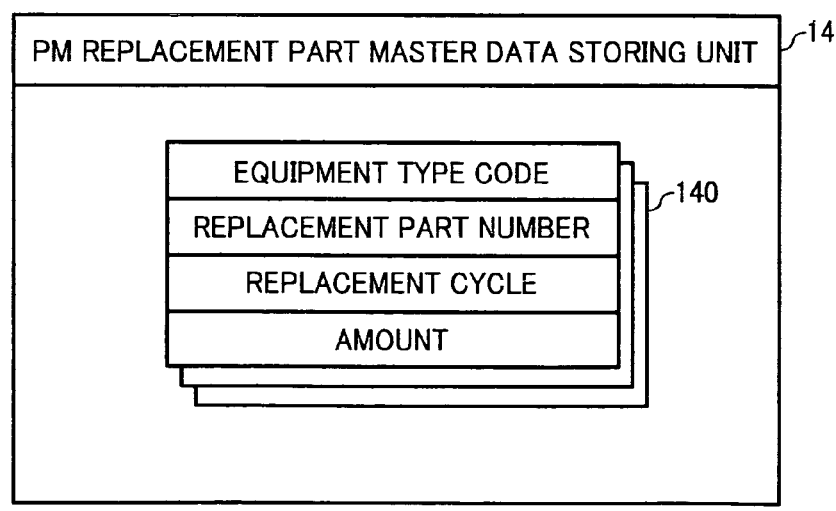
FIG. 5 is an explanatory diagram showing data stored at the PM replacement part master data storing unit.

A PM replacement part master data storing unit 14 functions as a part information storing unit. As shown in FIG. 5, the PM replacement part master data storing unit 14 stores PM replacement part master data 140 for specifying parts which will be targets of maintenance when performing periodic maintenance for each type of an electronic equipment. The PM replacement part master data storage unit 14 receives registration of those parts constituting the electronic equipment, when their replacement cycle is determined, of the parts. This PM replacement part master data 140 comprises data such as an equipment type code, an replacement part number, an replacement cycle, and quantity.

An equipment type code data field stores identifier information for specifying the equipment type of an electronic equipment which is the target of periodic maintenance.

A replacement part number data field stores identifier information for specifying parts constituting this electronic equipment, which can be targets of replacement in periodic maintenance.

A replacement cycle data field stores data related to quantity (replacement cycle quantity) for specifying a cycle in which this part is replaced. For example, in the case of a MFP, replacement cycle data field stores data indicating the number of outputs for specifying the timing in which an replacement is performed.

A number data field stores data indicating the number of parts to be replaced by periodic maintenance.

Figure 6:
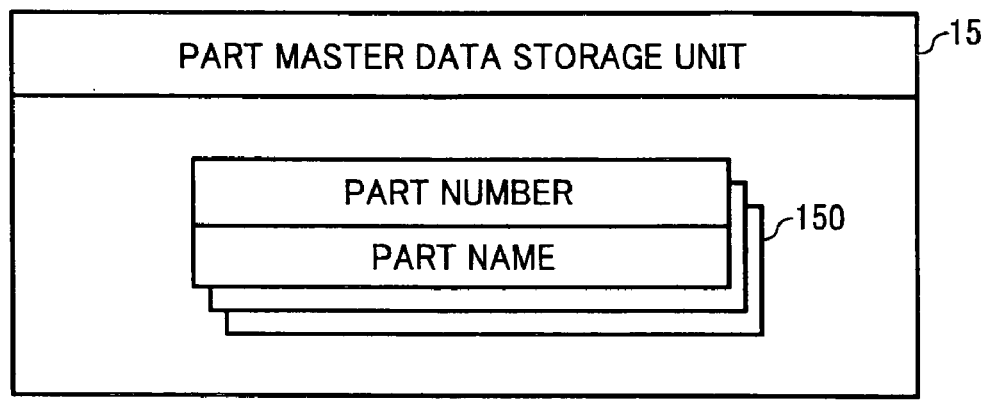
FIG. 6 is an explanatory diagram showing data stored at the part master data storing unit.

As shown in FIG. 6, the part master data storing unit 15 stores part master data 150 for specifying the name of each part. This part master data 150 comprises data concerning the part name to the part number.

A part number data field stores identifier information for specifying each part.

A part name data field stores data indicating the name of this part.

Figure 7:
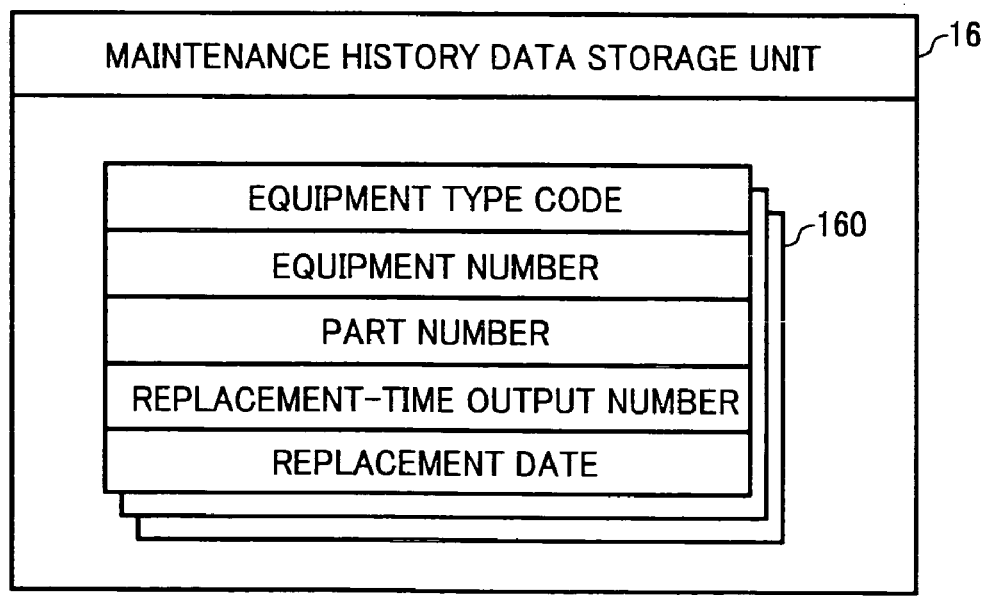
FIG. 7 is an explanatory diagram showing data stored at the maintenance history data storing unit.

The maintenance history data storing unit 16 functions as a maintenance history information storing unit, and stores maintenance history data 160 for specifying parts replaced by maintenance of an electronic equipment as shown in FIG. 7. This maintenance history data 160 is stored when maintenance of each electronic equipment (periodic maintenance, failure repair and others) is performed. The maintenance history data 160 comprises data such as the equipment type code, the equipment number, the part number, the number of replacement outputs, and the replacement year/month/date.

Data indicating the equipment type and the equipment number both for specifying an electronic equipment having performed maintenance is stored in an equipment type code and in an equipment number data field.

Identifier information for specifying parts replaced by maintenance is stored in a part number data field.

A replacement output number data field stores data indicating the number of outputs (replacement usage amount) when maintenance is performed.

A replacement year/month/date data field stores data specifying the date (replace date) when parts are replaced by maintenance.

The responsible personnel terminal 30 represents a maintenance responsible personnel terminal utilized by a customer engineer (maintenance responsible personnel), and is provided with a controlling unit including a CPU, an RAM, and an ROM, and an inputting unit (keyboard and pointing device), an outputting unit (display), a communicating unit, etc.

The replacement part management server 20 is a computer server which is connected to the responsible personnel terminal 30, and which controls ordering of parts to be replaced (replacement parts) when performing periodic maintenance of an electronic equipment utilized by a client (here, MFP). As shown in FIG. 12, the replacement part management server 20 comprises a controlling unit 21, a storing unit 22 comprised of a high-capacity storage apparatus and others, and a communicating unit 23 being provided with a communication interface communicating with other computers via a network, etc.

The controlling unit 21 comprises a CPU (Central Processing Unit) (not shown), an ROM (Read Only Memory) (not shown), and an RAM (Random Access Memory) (not shown), and controls the replacement part management server 20 as a whole. The CPU temporarily stores various data in the RAM, and utilizes the RAM as a work domain, performing a control/operation process according to the control program stored in the ROM and the storing unit 22.

The replacement part management server 20 functions as an replacement part order processing apparatus, and performs the processes described later (including acquisition of part identifier and replacement cycle amount, acquisition of replacement usage amount, calculation of a prediction residual, and generation of ordering information). By executing a replacement part order processing program stored in the storing unit 22, the controlling unit 21 functions as a maintenance target equipment specifying unit 211, a replacement part calculation unit 212, a replacement kit ordering unit 213, etc. Furthermore, the storing unit 22 functions as a part order data storing unit 27. This replacement part management server 20 is provided with a part order data storing unit 27.

Figure 8:
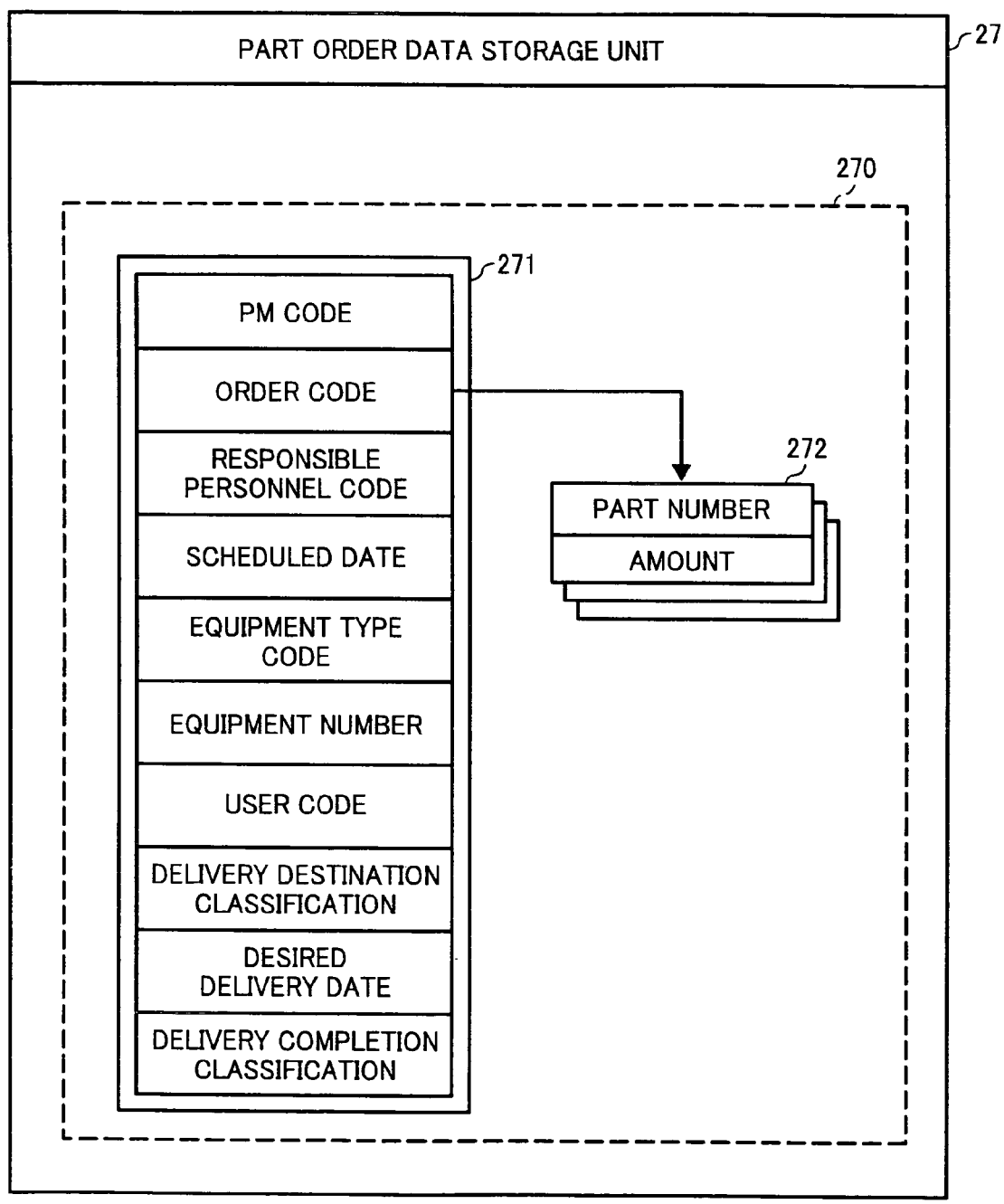
FIG. 8 is an explanatory diagram showing data stored at the part order data storing unit.

As shown in FIG. 8, the part order data storing unit 27 stores part order data 270 regarding ordering of parts used for performing periodic maintenance. Part order data 270 is stored when parts are ordered. This part order data 270 comprises condition setting data 271 and order part data 272.

The condition setting data 271 comprises data such as a PM code, an order code, a responsible personnel code, the scheduled date, an equipment type code, the equipment number, a user code, destination classification, desired delivery date, and completion classification. The order part data 272 comprises data related to the part number and the number, both to an order code of the condition setting data 271.

Identifier information for specifying this periodic maintenance is stored in the PM code data field.

Identifier information for specifying ordering of replacement parts by this periodic maintenance is stored in the order code data field. This order code is employed for relating the condition setting data 271 to the order part data 272, with respect to this part order data 270.

The responsible personnel code data field stores identifier information for specifying a customer engineer who performs this periodic maintenance. An engineer specified by this identifier information orders replacement parts.

The scheduled date data field stores data indicating the scheduled date when this maintenance is performed.

The equipment type code and in the equipment number data field stores data indicating the equipment type and the equipment number for specifying an electronic equipment which can be the target of this maintenance.

The user code data field stores identifier information for specifying a client using this electronic equipment.

The destination classification data field stores data indicating the delivery destination of a PM kit.

In this embodiment, location for use of a user in which a service station (SS) where a customer engineer resides or an electronic equipment is installed can be selected as this delivery destination classification.

The completion data field stores data for identifying package delivery and divisional delivery regarding the delivery date of parts included in the PM kit.

The part number data field stores data for specifying ordered replacement parts.

The number data field stores data related to the number of ordered replacement parts.

Next, a process procedure in the case of ordering replacement parts with the use of the above-mentioned system is explained. Here, a PM scheduling creation process and a replacement part ordering process are explained.

(PM Scheduling Creation Process)

When using a MFP and others, a periodic maintenance is performed. Specifically, a customer engineer visits a client and maintains the installed MFP. For example, this periodic maintenance is performed when the number of prints and others is reached to a predetermined amount.

Parts to be replaced by such a periodic maintenance have different replacement cycles. Therefore, periodic maintenance is performed in accord with the shortest of the replacement cycles of the parts used by a MFP. However, the parts to be replaced at the time differ in accord with replacement cycle of the part.

Furthermore, irregular failure repair, etc. may be performed besides the periodic maintenance.

In this case as well, part replacement is performed. When part replacement is performed prior to periodic maintenance during the period of periodic maintenance, those parts having not yet reached their replacement cycle need not be replaced.

The maintenance scheduling management server 10 executes a PM target equipment specifying process for specifying an electronic equipment which will be a target of periodic maintenance in the subsequent month. This PM target equipment specifying process is executed for each electronic equipment stored in the equipment file data storing unit 11.

Specifically, the maintenance scheduling management server 10 acquires an equipment type code of the currently processed electronic equipment and an output history data 120 having the equipment number from the output history data storing unit 12, and calculates the number of output prediction to the future date of the electronic equipment concerned. Then, the maintenance scheduling management server 10 specifies equipment file data 110 stored in the equipment file data storing unit 11 based on the equipment type code and the equipment number of this electronic equipment. The calculated number of output prediction specifies the future date (PM scheduled date) when the multiple number of a PM cycle stored in the specified equipment file data 110 is reached. Then, the maintenance scheduling management server 10 specifies this electronic equipment as a PM target when the PM scheduled date is arrived in the subsequent month.

The maintenance scheduling management server 10 issues a PM code to the electronic equipment specified as a PM target, and subsequently generates PM scheduling data 130 including the PM code, an equipment type code, the equipment number, the PM scheduled date, a user code, and a responsible personnel code, to be stored in the PM scheduling data storing unit 13. Furthermore, the maintenance scheduling management server 10 stores identifier data for specifying periodic maintenance in a work classification data field of the PM scheduling data 130.

(Replacement Part Ordering Process)

Figure 9:
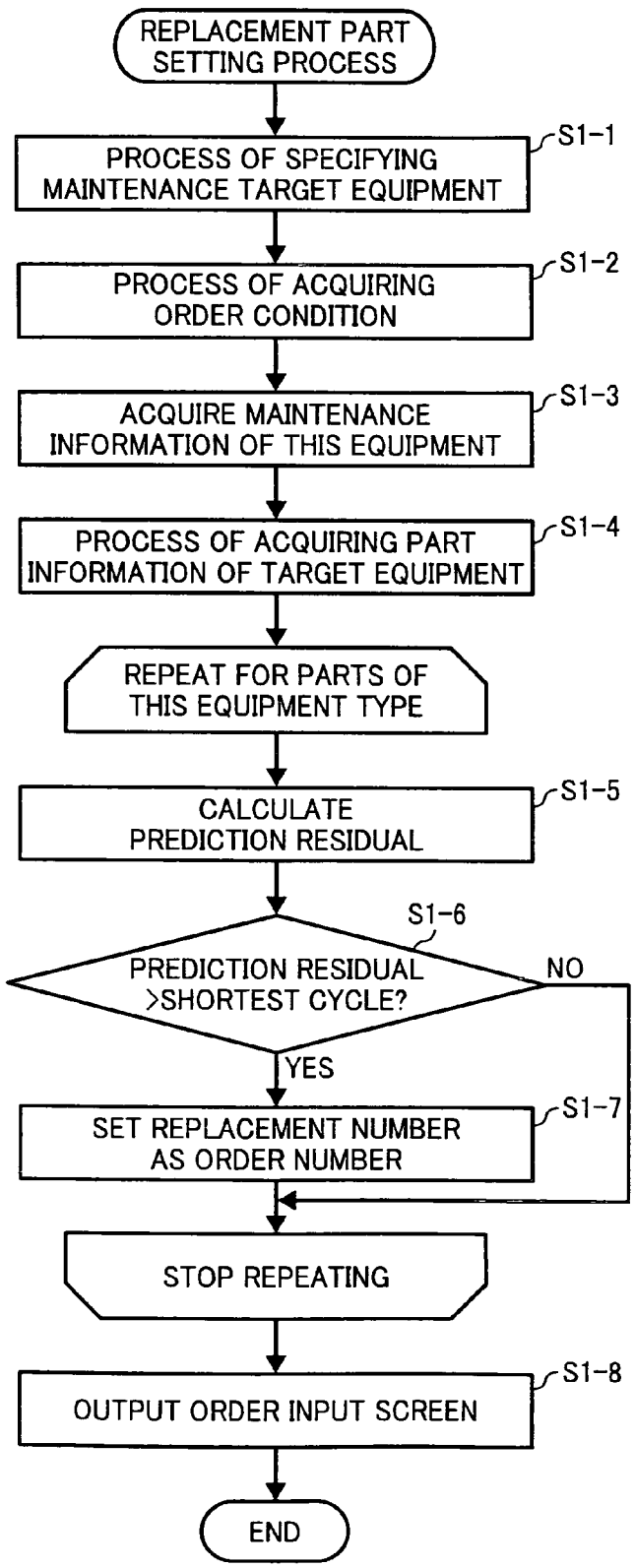
FIG. 9 is an explanatory diagram showing a processing procedure of one embodiment of the present invention.

Next, a replacement part ordering process will be explained in accordance with FIG. 9. In this embodiment, a case where a customer engineer operates the responsible personnel terminal 30 to access the replacement part management server 20 to schedule maintenance will be explained as an example.

Figure 10:
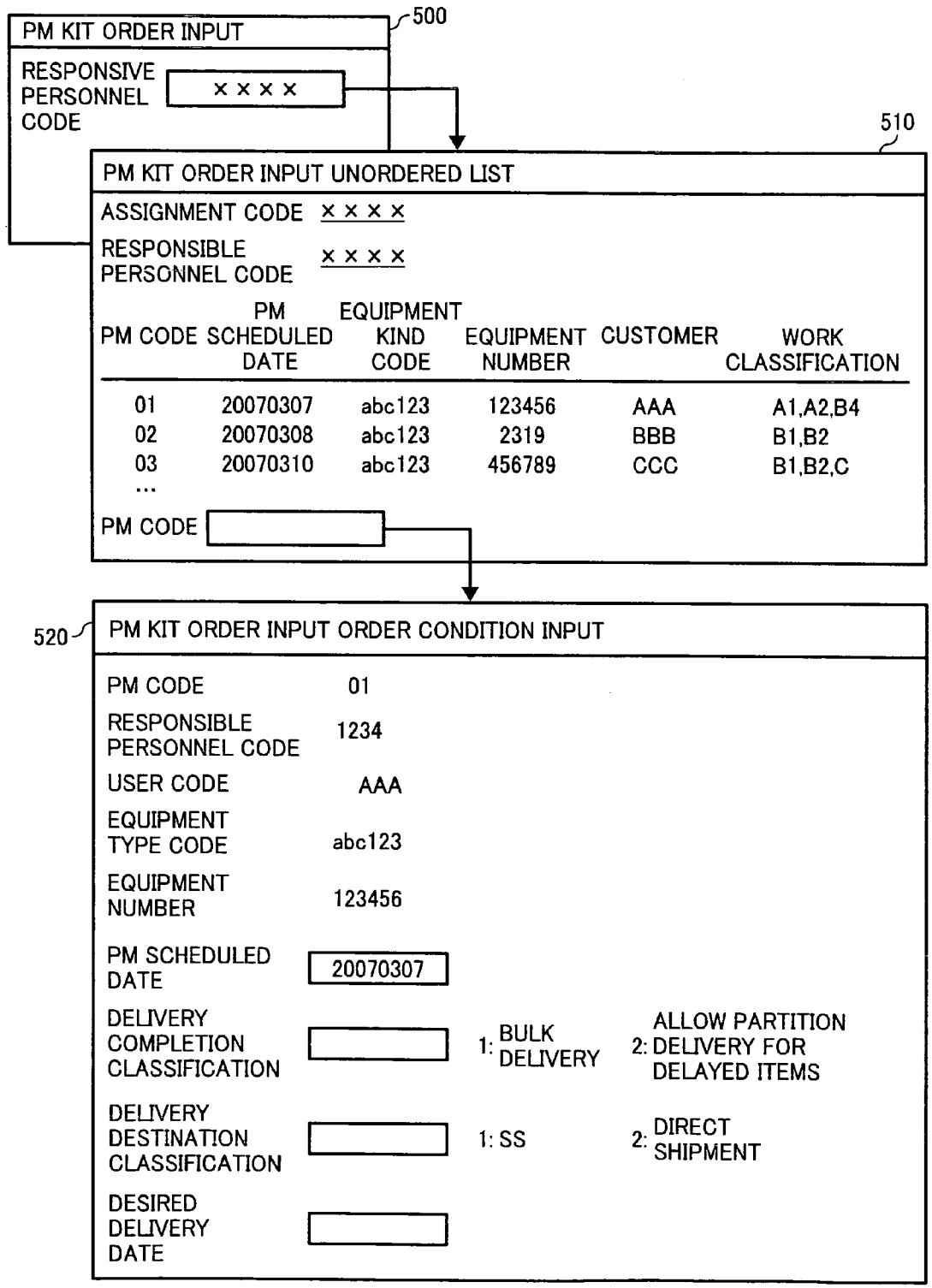
FIG. 10 is an explanatory diagram of a display screen being output to a display of a responsible personnel terminal.

When being accessed from the responsible personnel terminal 30, the controlling unit 21 of the replacement part management server 20 executes a process to specify a maintenance target equipment (step S1-1). Specifically, a maintenance target equipment specifying unit 211 of the controlling unit 21 transmits PM kit order input screen data to the responsible personnel terminal 30. A display screen 500 as shown in FIG. 10 is output on a display of the responsible personnel terminal 30 having received this data. This display screen 500 includes an entry field of the responsible personnel code.

The customer engineer operates an input unit such as a keyboard, sets information in each entry field, and inputs a transmission instruction. In response to the instruction, the responsible personnel terminal 30 transmits a viewing request to the replacement part management server 20. This viewing request includes data related to the responsible personnel code being set on the display screen 500.

The maintenance target equipment specifying unit 211 of the controlling unit 21 of the replacement part management server 20 having received the viewing request specifies the PM scheduling data 130 including this responsible personnel code from the PM scheduling data storing unit 13 with the use of the responsible personnel code acquired from the responsible personnel terminal 30. Then, the maintenance target equipment specifying unit 211 extracts the PM scheduling data 130 whose status data field does not store the "order completion" flag.

Then, the maintenance target equipment specifying unit 211 generates equipments-in-unordered-status list display screen data for displaying a list of the electronic equipments assigned to this responsible personnel, and transmits it to the responsible personnel terminal 30. A display screen 510 as shown in FIG. 10 is output to a display of the responsible personnel terminal 30 having received this data. A client name and work classification information, which are specified based on a PM code, the PM scheduled date, an equipment type code, the equipment number, and a user code are displayed on this display screen 510. Further, an entry field to input the PM code is included on this display screen 510. The customer engineer specifies an electronic equipment for ordering replacement parts, and inputs a transmission instruction after inputting the PM code into the PM code entry field. In response to the transmission instruction, the responsible personnel terminal 30 transmits the order input request to the replacement part management server 20. This order input request includes a PM code specified at the display screen 510.

Next, the controlling unit 21 of the replacement part management server 20 executes an acquisition process of ordering conditions (step S1-2). Specifically, the replacement part calculation unit 212 of the controlling unit 21 acquires PM scheduling data 130 including a PM code specified by the order input request. Then, the replacement part calculation unit 212 generates order condition input screen data based on this PM scheduling data 130, and transmits it to the responsible personnel terminal 30. Having received this data, a display of the responsible personnel terminal 30 outputs a display screen 520 as shown in FIG. 10. Information specifying the PM code, the responsible personnel code, the user code, the equipment type code, and the equipment number is displayed on the display screen 520. Further, entry fields to enter the PM scheduled date, the reporting classification, the completion classification, and the desired delivery date are included in the display screen 520. Here, the scheduled date stored in the PM scheduling data 130 is set as an initial value as the PM scheduled date. The customer engineer inputs a transmission instruction after inputting information in each entry field. In response to the transmission instruction, the responsible personnel terminal 30 transmits information included in the display screen 520, information input by the customer engineer, and an order screen request to the replacement part management server 20. The controlling unit 21 of the replacement part management server 20 having received the request generates part order data 270 including condition setting data 271 based on data received together with the request, and stores it in the part order data storing unit 27.

Next, the controlling unit 21 of the replacement part management server 20 executes a process to acquire maintenance information of this maintenance target equipment (step S1-3). Specifically, the replacement part calculation unit 212 of the controlling unit 21 first acquires a PM cycle from the equipment file data storing unit 11 with the use of the equipment type code of the maintenance target equipment, and temporarily stores it in a memory. The PM cycle acquired here is employed as the shortest cycle for determining replacement of parts in periodic maintenance.

Next, the controlling unit 21 of the replacement part management server 20 executes a process to acquire part information of a maintenance target equipment (step S1-4). Specifically, the replacement part calculation unit 212 of the controlling unit 21 specifies an equipment type code included in the generated condition setting data 271. Then, a replacement part calculation unit 212 acquires PM replacement part master data 140 including the specified equipment type code from the PM replacement part master data storing unit 14. The replacement part calculation unit 212 specifies the replacement part number stored in the acquired PM replacement part master data 140, and stores it in the order part data 272. "0" is set as the number of the order part data 272.

Then, the controlling unit 21 of the replacement part management server 20 executes a setting process of an initial value of the number ordered for every specified replacement part (steps S1-5 to S1-7).

First of all, the controlling unit 21 executes a process of calculating prediction residual regarding target parts of an initial value setting process (step S1-5). Specifically, the replacement part calculation unit 212 of the controlling unit 21 extracts maintenance history data 160 specified by the equipment type code, the equipment number, and the part number all included in the generated condition setting data 271 from the maintenance history data storing unit 16. In this way, the previously replaced replacement output number can be acquired. Further, when history of part replacement is not stored in the maintenance history. data storing unit 16, the number of replacement outputs is set to be "0".

Next, the replacement part calculation unit 212 extracts the equipment type code and output history data 120 specified at the electronic equipment of the equipment number from the output history data storing unit 12. Then, the current number of outputs (the number of the latest outputs) information at the extracted output history data 120 is acquired. The replacement part calculation unit 212 calculates the number of outputs (the number of difference outputs) from the previous replacement by subtracting the number of replacement outputs from this current number of outputs. Then, the replacement part calculation unit 212 acquires replacement cycle at the currently watched parts from the PM replacement part master data storing unit 14. The replacement part calculation unit 212 calculates prediction residual by subtracting the number of difference outputs from this replacement cycle.

Next, the controlling unit 21 of the replacement part management server 20 executes a comparison process between the prediction residual and the shortest cycle (step S1-6). Specifically, the replacement part calculation unit 212 of the controlling unit 21 compares the prediction residual calculated at the previous step with the shortest cycle of this equipment type acquired at step S1-3.

When the prediction residual is smaller than the shortest cycle (in the case of "Yes" at step S1-6), the controlling unit 21 of the replacement part management server 20 sets the number of replacements as the number of orders regarding this part (step S1-7). Specifically, the replacement part calculation unit 212 stores the number stored in the PM replacement part master data storing unit 14 as the number of the order part data 272 stored in the part order data storing unit 27.

On the other hand, when the remaining of the prediction residual is more than the shortest cycle (in the case of "No" at step S1-6), the controlling unit 21 of the replacement part management server 20 skips processes of step S1-7. In this case, "0" is sustained as the number of the order part data 272 stored in the part order data storing unit 27.

Then, the replacement part calculation unit 212 of the controlling unit 21 repeats the above-mentioned initial value setting processes for every part.

When an initial value setting process regarding all parts is completed, the controlling unit 21 of the replacement part management server 20 executes an output process of the ordered input screen (step S1-8). Specifically, the replacement part calculation unit 212 of the controlling unit 21 generates ordered part setting screen data with the use of the order part data 272, to be transmitted to the responsible personnel terminal 30. On the display of the responsible personnel terminal 30 having received this data, the display screen 530 indicated in FIG. 11 is output. Information indicating the part name, the replacement date, a counter, a replacement cycle, prediction residual, the number, and the number of orders are displayed on the display screen 530 for every part number stored in the order part data 272. This part name is displayed as the part name specified with the use of the part master data 150 stored in the part master data storing unit 15.

On the display screen 530, the numerical value of the order number section can be modified. A customer engineer inputs a transmission instruction after inputting information in each entry field. In response to the transmission instruction, the responsible personnel terminal 30 transmits various information included in the display screen 530, information regarding the input order number, and an order request to the replacement part management server 20.

Having received the request, the controlling unit 21 of the replacement part management server 20 renews order part data 272 stored in the part order data storing unit 27 based on the received information. Further, the controlling unit 21 of the replacement part management server 20 notifies the maintenance scheduling management server 10 of part order regarding the PM code related to this order. The maintenance scheduling management server 10 stores an "order completion" flag in a status data field of the PM scheduling data 130 concerning this PM code.

The order management server 40 acquires part order data 270 stored in the part order data storing unit 27, and transmits a preparation instruction of the PM kit to the purchaser. This preparation instruction includes data related to the part order data 270. The order management server 40 acquires delivery information based on the destination classification and on the user code both included in the condition setting data 271. The order management server 40 also determines the designated delivery date based on the desired delivery date included in the condition setting data 271.

The delivery destination creates a PM kit which puts the designated number of parts together to a package, and delivers this PM kit to the destination designated in the part order data 270 at the designated delivery date.

As described above, according to this embodiment, the controlling unit 21 executes a process of calculating prediction residual regarding target parts of the initial value setting process (step S1-5). The controlling unit 21 of the replacement part management server 20 executes a process of comparing between the prediction residual and the shortest cycle (step S1-6). When the prediction residual is smaller than the shortest cycle (in the case of "Yes" at step S1-6), the controlling unit 21 of the replacement part management server 20 sets the replacement number to be the quantity of this part being ordered (order number) (step S1-7). In this way, because the number of required replacement parts is set as an initial value in advance, a customer engineer can efficiently order replacement parts.

Also, according to this embodiment, the order management server 40 acquires the part order data 270 stored in the part order data storing unit 27, and transmits a preparation instruction of the PM kit to the purchaser. This condition setting data 271 comprises data related to the PM code, the order code, the responsible personnel code, the scheduled date, the equipment type code, the equipment number code, the user code, the destination classification, the desired delivery date, and the completion classification. On the other hand, the order part data 272 comprises data related to the part number and the number corresponding to the order code of this condition setting data 271. In this way, the customer engineer can acquire a PM kit putting required replacement parts together at the desired location and timing.

Further, the present invention is not limited to the above-mentioned embodiments, but may be applied to various variations and applications. Also, each constituent element of the above-mentioned embodiments may be freely combined.

For example, according to the above-mentioned embodiments, replacement parts employed for maintenance of an electronic equipment are ordered. However, electric equipment is not only the target for maintenance.

Also, while replacement parts employed for periodic maintenance are ordered in the above-mentioned embodiment, the current invention may be applied to irregular maintenance. In this case, client visit can efficiently be made by performing part replacement of periodic maintenance in irregular maintenance.

Also, in the above-mentioned embodiment, a PM cycle (shortest cycle amount) is specified with the use of the equipment file data 110 stored in the equipment file data storing unit 11. Instead, the controlling unit 21 of the replacement part management server 20 may be constituted in such a way as to specify the shortest cycle amount with the use of the replacement cycle stored in the PM replacement part master data 140 of the PM replacement part master data storing unit 14. In this case, the controlling unit 21 may use the shortest period as a PM cycle of replacement cycles of parts in association with the equipment type code of a maintenance target equipment.

Also, while the function is distributed into a plurality of servers in the above-mentioned embodiment, all the function may be implemented on one server.

Various embodiments and changes may be made thereunto without departing from the broad spirit and scope of the invention. The above-described embodiment is (embodiments are) intended to illustrate the present invention, not to limit the scope of the present invention. The scope of the present invention is shown by the attached claims rather than the embodiment (embodiments). Various modifications made within the meaning of an equivalent of the claims of the invention and within the claims are to be regarded to be in the scope of the present invention.

This application is based on Japanese Patent Application No. 2007-018395 filed on Jan. 29, 2007 and including specification, claims, drawings and summary. The disclosure of the above Japanese Patent Application is incorporated herein by reference in its entirety.

What is claimed is:

1. A replacement part order processing apparatus connected to a maintenance responsible personnel terminal via a network, and specifying parts that need replacing in an equipment that is target for maintenance, the apparatus comprising:
a part information storing unit that stores part identifier information and replacement cycle amount information of parts for use in maintenance of equipment, in such a way that both information is associated with equipment type information indicating the type of equipment that is the target of maintenance;
a maintenance target equipment information storing unit that stores: maintenance target equipment identifier information for specifying maintenance target equipment; equipment type information of the maintenance target equipment; and shortest cycle amount information indicating a shortest of cycle amounts in which to perform maintenance of the target equipment, in such a way that the each information is associated with each other for each maintenance target equipment;
an output history information storing unit that stores: maintenance target equipment identifier information for specifying the maintenance target equipment; usage amount information indicating the usage amount of the maintenance target equipment; and confirmation date information indicating the date in which the usage amount is confirmed, in such a way that each information is associated with each other for each maintenance target equipment;
a maintenance history information storing unit that stores, for each replacement of parts performed, maintenance target equipment identifier information specifying the equipment in which the part is used, part identifier information specifying the replaced part, a date on which the parts are replaced, and a replacement-time usage amount information indicating a usage amount of the maintenance target equipment at the date on which the parts are replaced, in such a way that each information is associated with each other; and
a controlling unit which performs a replacement part specifying process for specifying a part in need of replacement in a maintenance target equipment,
wherein in the replacement part specifying process, the controlling unit:
when maintenance target equipment identifier information is acquired from the maintenance responsible personnel terminal, acquires equipment type information associated with the maintenance target equipment identifier information from the maintenance target equipment information storing unit and acquires part identifier information and replacement cycle amount information, each of which is associated with the equipment type information, to perform a periodic maintenance in accordance with a shortest of the replacement cycles of the parts periodically being replaced in the maintenance target equipment, from the part information storing unit;
for each of the parts specified by the part identifier information, acquires replacement-time usage amount indicating the usage amount at the time of the nearest replacement from the maintenance history information storing unit;
for each of the specified parts, acquires a current usage amount of the maintenance target equipment associated with maintenance target equipment identifying information of the maintenance target equipment from the output history information storing unit, calculates a difference obtained by subtracting the replacement-time usage amount from the current usage amount, and calculates a prediction residual by subtracting the difference from the acquired replacement cycle amount; and
for each of the specified parts, compares the shortest cycle amount of the maintenance target equipment stored at the maintenance target equipment information storing unit with the calculated prediction residual, and executes a generation process of generating order information for ordering the part when the prediction residual is smaller than the shortest cycle.

2. The replacement part order processing apparatus according to claim 1, wherein
in the generation process, the controlling unit acquires information related to scheduled maintenance date from the maintenance responsible personnel terminal and generates order information of the parts by setting a desired delivery date based on the scheduled maintenance date.

3. The replacement part order processing apparatus according to claim 1, wherein
in the generation process, the controlling unit acquires information related to a location of installation of a maintenance target equipment from the maintenance responsible personnel terminal and generates order information of the parts by setting a delivery destination based on the installation location.

4. A method for ordering replacement parts executed by a replacement part order processing apparatus which is connected to a maintenance responsible personnel terminal via a network, the replacement part order processing apparatus comprising a part information storing unit, a maintenance target equipment information storing unit, an output history information storing unit, a maintenance history information storing unit, and a controlling unit, the method comprising the steps of:

i) storing part identifier information and replacement cycle amount information of parts for use in maintenance of equipment, in such a way that both information is associated with equipment type information indicating the type of equipment that is the target of maintenance, the step i) executed by the part information storing unit;

ii) storing: maintenance target equipment identifier information for specifying maintenance target equipment; equipment type information of the maintenance target equipment; and shortest cycle amount information indicating a shortest of cycle amounts in which to perform maintenance of the target equipment, in such a way that the each information is associated with each other for each maintenance target equipment, the step executed by the maintenance target equipment information storing unit;

iii) storing: maintenance target equipment identifier information for specifying the maintenance target equipment; usage amount information indicating the usage amount of the maintenance target equipment; and confirmation date information indicating the date in which the usage amount is confirmed, in such a way that each information is associated with each other for each maintenance target equipment, the step executed by an output history information;

iv) storing: for each replacement of parts performed, maintenance target equipment identifier information specifying the equipment in which the part is used, part identifier information specifying the replaced part, a date on which the parts are replaced, and a replacement-time usage amount information indicating a usage amount of the maintenance target equipment at the date on which the parts are replaced, in such a way that each information is associated with each other, the step iv) executed by the maintenance history information storing unit; and v) specifying a part in need of replacement in a maintenance target equipment, the step v) executed by the controlling unit, wherein the step v) comprises the steps, executed by the controlling unit, of:

when maintenance target equipment identifier information is acquired from the maintenance responsible personnel terminal, acquiring equipment type information associated with the maintenance target equipment identifier information from the maintenance target equipment information storing unit and acquiring part identifier information and replacement cycle amount information, each of which is associated with the equipment type information, to perform a periodic maintenance in accordance with a shortest of the replacement cycles of the parts periodically being replaced in the maintenance target equipment, from the part information storing unit;

for each of the parts specified by the part identifier information, acquiring replacement-time usage amount indicating the usage amount at the time of the nearest replacement from the maintenance history information storing unit;

for each of the specified parts, acquiring a current usage amount of the maintenance target equipment associated with maintenance target equipment identifying information of the maintenance target equipment from the output history information storing unit, calculating a difference obtained by subtracting the replacement-time usage amount from the current usage amount, and calculating a prediction residual by subtracting the difference from the acquired replacement cycle amount; and for each of the specified parts, comparing the shortest cycle amount of the maintenance target equipment stored at the maintenance target equipment information storing unit with the calculated prediction residual, and executing a generation process of generating order information for ordering the part when the prediction residual is smaller than the shortest cycle.

5. A computer-readable recording medium storing a program for controlling a computer connected to a maintenance responsible personnel terminal via a network to function as:

a part information storing unit that stores part identifier information and replacement cycle amount information of parts for use in maintenance of equipment, in such a way that both information is associated with equipment type information indicating the type of equipment that is the target of maintenance;

a maintenance target equipment information storing unit that stores: maintenance target equipment identifier information for specifying maintenance target equipment; equipment type information of the maintenance target equipment; and shortest cycle amount information indicating a shortest of cycle amounts in which to perform maintenance of the target equipment, in such a way that the each information is associated with each other for each maintenance target equipment;

an output history information storing unit that stores: maintenance target equipment identifier information for specifying the maintenance target equipment; usage amount information indicating the usage amount of the maintenance target equipment; and confirmation date information indicating the date in which the usage amount is confirmed, in such a way that each information is associated with each other for each maintenance target equipment;

a maintenance history information storing unit that stores, for each replacement of parts performed, maintenance target equipment identifier information specifying the equipment in which the part is used, part identifier information specifying the replaced part, a date on which the parts are replaced, and replacement-time usage amount information indicating a usage amount of the maintenance target equipment at the date on which the parts are replaced, in such a way that each information is associated with each other; and a controlling unit which performs a replacement part specifying process for specifying a part in need of replacement in a maintenance target equipment, wherein in the replacement part specifying process, the controlling unit:

when maintenance target equipment identifier information is acquired from the maintenance responsible personnel terminal, acquires equipment type information associated with the maintenance target equipment identifier information from the maintenance target equipment information storing unit and acquires part identifier information and replacement cycle amount information, each of which is associated with the equipment type information, to perform a periodic maintenance in accordance with a shortest of the replacement cycles of the parts periodically being replaced in the maintenance target equipment, from the part information storing unit;

for each of the parts specified by the part identifier information, acquires replacement-time usage amount indicating the usage amount at the time of the nearest replacement from the maintenance history information storing unit;

for each of the specified parts, acquires a current usage amount of the maintenance target equipment associated with maintenance target equipment identifying information of the maintenance target equipment from the output history information storing unit, calculates a difference obtained by subtracting the replacement-time usage amount from the current usage amount, and calculates a prediction residual by subtracting the difference from the acquired replacement cycle amount; and for each of the specified parts, compares the shortest cycle amount of the maintenance target equipment stored at the maintenance target equipment information storing unit with the calculated prediction residual, and executes a generation process of generating order information for ordering the part when the prediction residual is smaller than the shortest cycle.

* * * * *